(12) United States Patent
Goldsmith

(10) Patent No.: US 7,036,146 B1
(45) Date of Patent: Apr. 25, 2006

(54) SYSTEM AND METHOD FOR SECURE GROUP TRANSACTIONS

(75) Inventor: Steven Y. Goldsmith, Rochester, MN (US)

(73) Assignee: Sandia Corporation, Albuquerque, NM (US)

( * ) Notice: Subject to any disclaimer, the term of this patent is extended or adjusted under 35 U.S.C. 154(b) by 866 days.

(21) Appl. No.: 09/962,474

(22) Filed: Sep. 24, 2001

Related U.S. Application Data

(60) Provisional application No. 60/237,934, filed on Oct. 3, 2000.

(51) Int. Cl.
| | |
|---|---|
| G06F 12/00 | (2006.01) |
| G06F 12/14 | (2006.01) |
| G06F 13/00 | (2006.01) |
| G06F 17/30 | (2006.01) |
| G06F 7/04 | (2006.01) |

(52) U.S. Cl. .................. 726/21; 726/1; 709/201; 709/202; 709/203

(58) Field of Classification Search ........ 713/175–177, 713/168; 380/47; 726/21
See application file for complete search history.

(56) References Cited

U.S. PATENT DOCUMENTS

| | | | | |
|---|---|---|---|---|
| 5,365,523 | A | | 11/1994 | Derby et al. ............. 370/85.2 |
| 5,610,982 | A | * | 3/1997 | Micali ..................... 713/157 |
| 5,745,754 | A | | 4/1998 | Lagarde et al. ........... 395/615 |
| 5,754,659 | A | * | 5/1998 | Sprunk et al. ............ 380/30 |
| 5,754,939 | A | * | 5/1998 | Herz et al. .............. 455/3.04 |
| 5,852,814 | A | * | 12/1998 | Allen ..................... 706/13 |
| 5,950,195 | A | * | 9/1999 | Stockwell et al. .......... 707/4 |
| 6,029,201 | A | | 2/2000 | Neill ..................... 709/228 |
| 6,044,402 | A | | 3/2000 | Jacobson et al. ......... 709/225 |
| 6,167,522 | A | | 12/2000 | Lee et al. ............... 713/201 |
| 6,169,805 | B1 | | 1/2001 | Dunn et al. ............. 380/277 |
| 6,754,643 | B1 | * | 6/2004 | Goldsmith .............. 706/14 |
| 2003/0033302 | A1 | * | 2/2003 | Banerjee et al. ............ 707/6 |
| 2003/0233274 | A1 | * | 12/2003 | Urken et al. ............. 705/12 |
| 2005/0141706 | A1 | * | 6/2005 | Regli et al. ............. 380/44 |

OTHER PUBLICATIONS

Aura, Tuomas. "On the Structure of Delegation Networks", CSFW 1998, pp. 14-26.*
Bamasak, Omaima et al. "A secure method for signature delegation to mobile agents", SAC 2004, pp. 813-818.*
Capocelli, Renato M. et al. "On the Size of Shares for Secret Sharing Schemes", CRYPTO 1991, pp. 101-113.*
Desmedt, Yvo. "Society and Group Oriented Cryptography: A New Concept", CRYPTO 1987, pp. 120-127.*
Dwork, Cynthia. "On Verification in Secret Sharing", CRYPTO 1991, pp. 114-128.*

(Continued)

Primary Examiner—Gilberto Barrón, Jr.
Assistant Examiner—Michael J. Simitoski
(74) Attorney, Agent, or Firm—Carol I Ashby

(57) ABSTRACT

A method and a secure system, processing on one or more computers, provides a way to control a group transaction. The invention uses group consensus access control and multiple distributed secure agents in a network environment. Each secure agent can organize with the other secure agents to form a secure distributed agent collective.

8 Claims, 4 Drawing Sheets

OTHER PUBLICATIONS

Frankel, Yair et al. "Shared Generation of Authenticators and Signatures (Extended Abstract)", Lecture Notes in Computer Science, vol. 576, Jan. 1992, p. 457.*
German, John. "Sandia-developed intelligent software agents challenge electronic intruders", May 2000, <http://www.sandia.gov/LabNews/LN05-19-00/software_story.html>.*
Goldsmith, Steven Y. et al. "Object Frameworks for Agent System Development", 1998.*
Kim, Seungjoo. "Proxy signatures, Revisited", ICICS 1997: 223-232.*
Kotzanikolaou, Panayiotis. "Secure Transactions with Mobile Agents in Hostile Environments", ACISP 2000: 289-297.*
Li, Ninghui et al. "A Logic-based Knowledge Representation for Authorization with Delegation", CSFW 1999: 162-174.*
Lindquist, Chris. "Intelligent Agents Fight Computer Intruders", Sep. 2000, <http://www.cio.com/archive/090100_et_development.html>.*
McKay, Niall. "Software agents get smart", Mar. 2001, <http://www.redherring.com/PrintArticle.aspx?a=8928&sector=Archive>.*
Orr, Tony Lee. "Sandia trains agent to deal with pesky intruders", Jul. 2000, <http://web.archive.org/web/20000817004421/http://www.gcn.com/vol19_no18/news/2327-1.html>.*
Shoup, Victor. "Practical Threshold Signatures", EUROCRYPT 2000: 207-220.*
Woo, Thomas Y. C.. "Designing a Distributed Authorization Service", INFOCOM 1998: 419-429.*
Gilliom, Laura R. "Engineerd Collectives: Agent-Enabled Assurance of Distributed Information Systems", Sep. 27-28, 2000.*
Korba, L. "Towards Secure Agent Distribution and Communication", Proceedings of the 32nd Hawaii International Conference on System Science (HICSS'32), Maui, Hawaii, USA. Jan. 5-8, 1999.*
Yokoo, Makoto et al. "The Effect of False-name Declarations in Mechanism Design: Toward Collective Decision Making on the Internet", Apr. 10-13, 2000.*
Co-pending US patent application claims "*Method and Transaction Framework for Secure Agents*", Goldsmith, S. Y., commonly assigned to Sandia Corporation, Albuquerque, New Mexico.

* cited by examiner

SYSTEM AND METHOD FOR SECURE GROUP TRANSACTIONS

This application claims the benefit of U.S. Provisional Application 60/237,934, filed Oct. 3, 2000.

This invention was made with Government support under Contract DE-AC04-94AL85000 awarded by the U.S. Department of Energy. The Government has certain rights in the invention.

RELATED PATENT APPLICATIONS

A co-pending, related application entitled "Method and Transaction Framework for Secure Agents," both with the same inventor and both assigned to Sandia National Laboratories, has been filed on the same date as this application.

BACKGROUND OF THE INVENTION

The present invention relates to the field of group transactions and more particularly to secure systems for controlling distributed group transactions.

Adaptive agent systems are information and transaction processing systems especially for use with intelligent agents. The addition of network and computer security can also address a malicious insider threat or network intrusion, and can be used to facilitate electronic commerce and electronic information transactions including tele-education, telecommunication within the work environment, and telemedicine. Adaptive agent sytems and methods are not limited to fixed computing platforms but can be distributed and used on mobile platforms with compute capabilities (for example, mobile robots), as well as on multiple interconnected computers.

A class of tasks in information and transaction processes, both computerized and manual, involves simultaneous or sequential decisions (for example, review of a common information element) by a number of administrators, evaluators, and approvers. The information element is reviewed, then delivered or posted to a requester process. The information element can be any digitized document or electronic computer file, for example: a business form, memorandum, legal document, government form, letter, e-mail, software listing, video file, audio file, image file, and other similar elements. The requester process can include any kind of consensus task, for example: public notarization by multiple parties, review and approval of information prior to dissemination, negotiation of multi-party business contracts, release of software versions, installation of software on network computers, co-writing of documents, merging of multiple disparate or redundant elements, among other consensus tasks.

In a computer network of processers/computers and users, a corrupt system administrator with root (for example, system-high) privileges represents the ultimate insider threat to network integrity. The administrator, with relatively little effort, can access cryptographic keys, obtain sensitive data (for example, credit card numbers and proprietary documents), disable protection mechanisms and security monitors, implement disruptive software without disclosure in audit logs, usurp other super-system-users, mount repudiable attacks on other domains, and perform other subtle actions that compromise the integrity and secrecy of network functions.

An approach often used in the safeguards or security area, involving the use of human actors in protection, is the N-person Rule requiring N participants for the security function. A weakness in this approach, for computerized processes, is that a computer network with multiple administrators sharing root privileges introduces multiple single-points-of-failure in the security process. Furthermore, malicious administrators can collaborate to undermine the network and its users by forming minority and majority coalitions of loyal and corrupt administrators.

A group authentication process is needed to provide security to information transactions and to avoid compromising information through transmission, unauthorized access, or loss of integrity of the contents of the information. The use of multiple agents is needed in transactions to control access over a network.

Computer Information Requests

Neill, U.S. Pat. No. 6,029,201 (2000), describes a communication system for accessing system services on a network of information handling devices, using connection to service access agents with dynamically assigned sockets. A server is adapted to perform a security check on a request before requesting access.

Derby et al., U.S. Pat. No. 5,365,523 (1994), describes a group of access agents at a LAN/WAN interface, or a network-to-network interface, where the group communicates to form and to cooperate as a Multiple Access Group.

Lagarde et al., U.S. Pat. No. 5,745,754 (1998), describes a World Wide Web browser making requests to web servers on a network through URLs to a control program agent.

Security Over Networks

Attacks to computers have been classified into three classes: Class I attacks over network interfaces (for example, via communications ports), Class II attacks to system software, and Class III attacks to system hardware/firmware.

Lee et al., U.S. Pat. No. 6,167,522 (2000), describes a method and apparatus for providing security for a server executing application programs received by the server via a network.

Dunn et al., U.S. Pat. No. 6,169,805 (2001), describes a system and method of operation for providing secure communication on-demand over insecure networks.

Jacobson et al., U.S. Pat. No. 6,044,402 (2000), describes a network connection blocker for monitoring connections between network computers and blocking unwanted connections.

There is a need for distributed group transactions in secure environments.

SUMMARY OF THE INVENTION

This invention is summarized in the appended claims. For example, this invention provides a secure system for controlling a group transaction, processing on one or more computers, comprising: a network environment, interconnecting the one or more computers; an information element, accessible through the network environment; a group consensus access control, enforcing a secure consensus decision for the information element; and a plurality of distributed secure agents controlling access to the network environment using the group consensus access control.

BRIEF DESCRIPTION OF THE FIGURES

The accompanying drawings, which are incorporated into and form part of the specification, illustrate embodiments of the invention and, together with the description, serve to explain the principles of the invention.

DETAILED DESCRIPTION OF THE INVENTION

Figure 1:
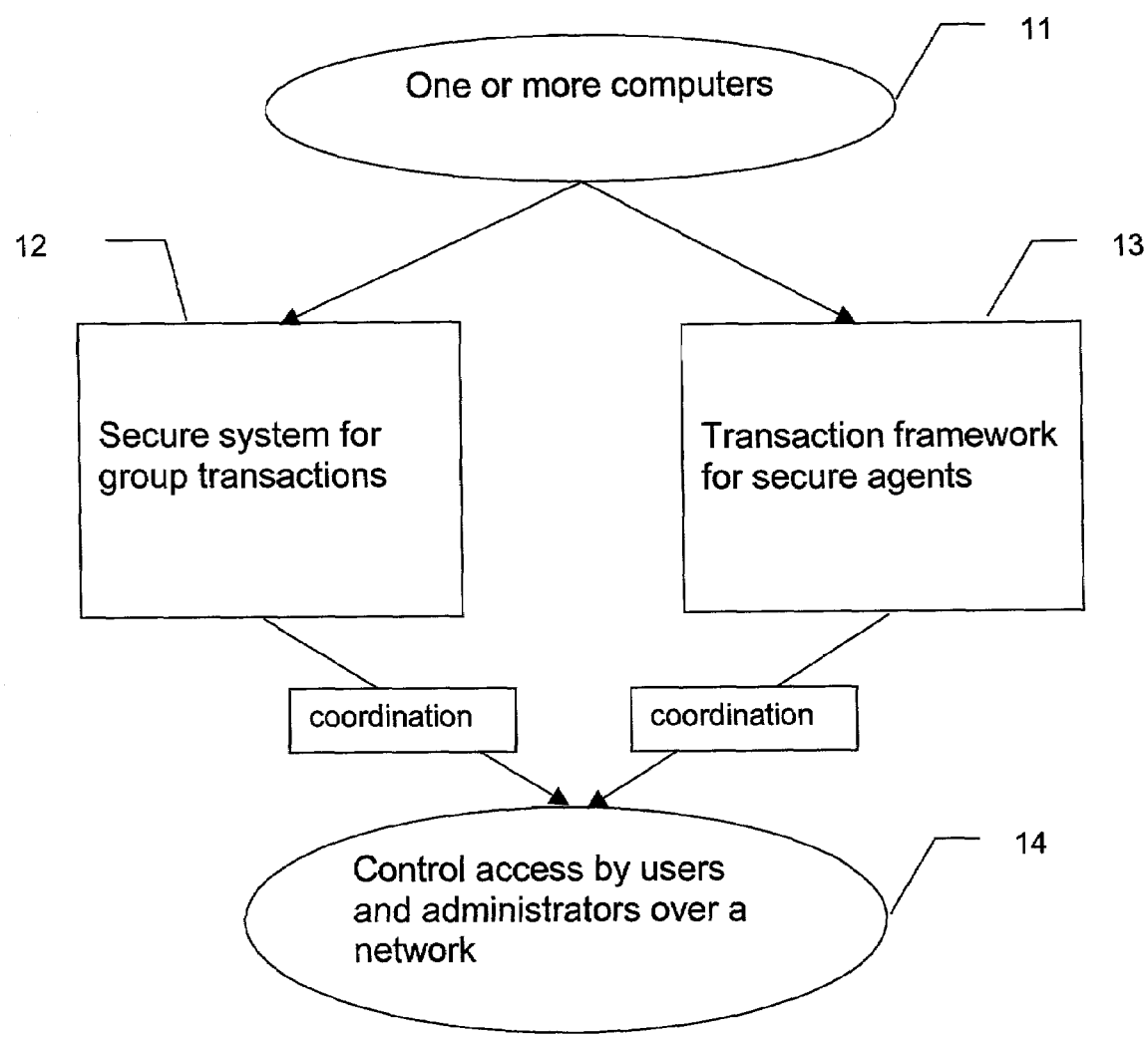
FIG. 1 is a diagram showing coordination between a secure system for group transactions and a transaction framework for secure agents according to the present invention.

FIG. 1 is a diagram showing coordination between a secure system for group transactions and a transaction framework for secure agents according to the present invention. FIG. 1 shows one or more computers 11, interconnected through a network environment, participating in a secure system for group transactions 12 and a transaction framework for secure agents 13, that are coordinated to control access by users and administrators over the network 14.

This invention provides the transaction framework for secure agents 13 (for example, secure and intelligent agents) coordinated with the secure system for group transactions 12 suitable for controlling group transactions and access to information on a network of information computers accessible by users and administrators. The invention works for network computers in a client-server configuration as well as in a peer-to-peer arrangement. Agents, as in the present invention, are intelligent and have, but are not limited to, the following attributes: autonomous, reactive, proactive, deliberative, social, adaptive, learning, and mobile. A schema gives a description of a state of the work that the agent can compare to the real world. Agents in the network validate well-formed transactions that preserve integrity. One model that can be used is the Clark-Wilson security model, known to those in the art.

A class of tasks in information processes, both computerized and manual, involves simultaneous or sequential decisions (for example, review of a common information element) by a number of authoritative agents. The information element is reviewed, and if certified, the information element is posted to a requester process, either human or software-based, through some means of electronic or paper-based transmission. The information element can be any kind of digitized document or other computer file (for example, a business form, memorandum, legal document, government form, letter, electronic-mail, software listing, video file, audio file, image file, or other format for shared information). Processing agents can be human actors, software agents, or other software programs, may even be implemented in hardware or firmware or some other intelligent processing implementation with cognitive or reasoning capabilities. The processing task benefits from the separation of duty principle, which requires multiple agents to evaluate, review, negotiate, and come to consensus as to the final content of the information element. The processing task can be any type of consensus task, for example: public notarization (by multiple parties), review and approval of information before dissemination, negotiation of multi-party business contracts, release of software versions, installation of software on network computers, co-writing of documents, and merging of several disparate or redundant elements. The final result is certified or sealed by the collective of agents in a secure manner that links collective agent concurrence regarding content of the information element with the information element content itself to enable auditing, attribution, performance evaluation, and non-repudiation. Some form of group digital signature (for example, a threshold digital signature) can prevent one or more malicious agents from forging the digital signature and circumventing the consensus process and can enable a loyal subset of agents to conduct operations whenever a disloyal subset refuses to participate. The present invention provides a technical solution to the problem of malicious administrators and evaluators.

An prototyped example includes a group of system administrators/document approvers. A corrupt system administrator with root privileges represents the ultimate insider threat to the integrity of a network of computers and its users. The administrator, with system-high privileges and expending relatively little effort, can access cryptographic keys, obtain sensitive data (for example, credit card numbers and proprietary or sensitive documents), disable protection mechanisms and security monitors, implement disruptive software without disclosure in audit logs, usurp other super-system-users, mount repudiable attacks on other domains, and perform other subtle actions that compromise the integrity and secrecy of network functions. Corporate and institutional computer networks often have a staff of administrators that share root privileges, which introduces multiple possibilities for single-point failures in the security process. Malicious administrators can collaborate to undermine the network and its users by forming minority and majority coalitions. Malicious administrators can issue domain commands which can change critical computer, network configuration, and software modules (for example, access control lists).

The present invention can provide an autonomous high-integrity environment (for example, an intra-network within a company) and can have application to: control of physically mobile agents (for example, a group of robots in a collective), as well as control of software agents (for example, nodes in a network or one node of a network).

Group Workflow

An autonomous secure collective governs network activities of server agents, for example, using group protocols to certify its responses, and enforces security policy. Individual agents must implement an authenticating chokepoint filter on all network input streams.

Figure 2:
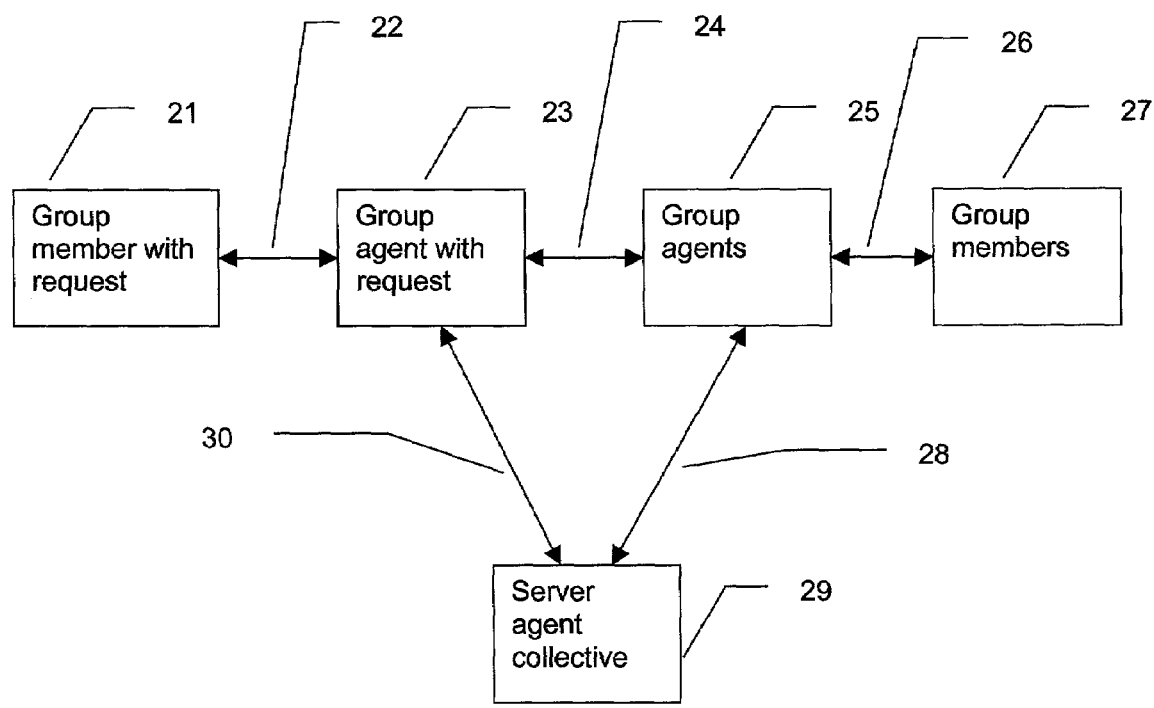
FIG. 2 is a high-level process flow diagram showing the present invention.

FIG. 2 is a high-level process flow diagram showing the present invention. Group member with request 21 exchanges requests and information 22 through its corresponding group agent with request 23. Similarly, group members 27 exchange requests and information 26 through their corresponding group agents 25. All agents (for example, group agent with request 23, group agents 25, and server agent collective 29) control transactions and access over a network through bi-directional requests and responses 23, 25, and 29.

FIG. 2 depicts a group workflow process diagram that is discussed below for an embodiment of the present invention showing access to a server coalition controlled by an authority group (for example, a domain authority group). Each group member with request 21 has an associated personal group agent 23. Each member in the set of group members 27 has an associated personal group agent in the set of group agents 25. Group member 21 with a request initiates request 22 by accessing local personal group agent 23 associated with group member 21. Group agent 23 contacts the other group agents 25 with request 24. Group agents 25 send request 26 to group members 27 for acceptance or rejection.

Each serving computer in server agent collective 29 implements an authenticating chokepoint filter that rejects network commands that are not signed with a valid group signature. A message from the agents (for example, domain authority group (DAG) agents) with a valid group signature is a certified command 28. Each serving computer must be able to withstand network attacks as well as operating system and hardware tampering. To protect against a compromised serving computer, server agent collective 29 must implement its own group signature protocol to certify its responses to the DAG agents (and under some circumstances to users as well). Consequently, server agent collective 29 must have a separate group signature process with a distinct public-private key pair. A published response from server agent collective 29 with a valid signature is a certified result or response 30.

Continuing the above implementation example, decentralized domain authority (DDA) can be implemented to prevent an attack by a single malicious administrator or a minority coalition of malicious administrators. Under DDA, administrative functions performed on domain serving computers that have system-high consequences require a majority consensus of administrators before action is taken on any network serving computer. The administrators form an authority group (for example, a domain authority group, or DAG) in which authority to perform critical operations is decentralized and no single administrator has ultra-privileges. Critical changes to serving computer configurations and software are set through network commands that are authenticated using a threshold digital signature scheme. The DAG constitutes a virtual administrator, conceptually an extension of the separation of duty security policy (of which the N-person rule is an instance). The DAG completes an N-person group signature procedure that signs a request before any serving computer will accept the request. Specialized software runs on serving computers to enable the performance of certain network services only upon validating the requests using a pre-specified public key. The DAG works within a collaborative process in which redundancy of activities is implicit. For example, to add a new user to the network, a specific majority of administrators reviews the potential new user's credentials and engages in the group signature process to sign those credentials. The signed credential is multicast by each DAG member to all of the network computers. Upon reaching consensus and validating the group signature, the computers add the new user to their respective access control lists. The DAG is notified by all the serving computers that the access list has been updated. Upon receipt of notification by the DAG, the transaction is complete. The process enables DAG members to create certified commands to server agent collective 29. Each DAG member can access its own local personal DAG agent by entering the agent URL into a Web browser. The DAG agent can then return a log-on page requiring the member's password. Upon successful log-in, the agent returns a page with the DAG name, the identifiers of the members currently logged in, and a list of URLs identifying pending signature requests issued by the DAG. A text area is presented on the page to enable entry of a signing request. A DAG member 21 initiates a request 22 by entering the command text into a text area on the Web page and submitting the page. The DAG agent 23 contacts the other DAG agents 25 with the request 24. The remaining DAG agents 25 log the request and send the request to DAG members 27 for acceptance or rejection. The request page displays the text in a no-edit mode and provides a selector for acceptance. DAG members 27 submit the page when the review is complete. If every member 27 has accepted the request 26, the DAG agents 25 engage in a multiparty signature protocol. The results of the protocol (success or failure) are logged by the DAG agents 25 and reported to the DAG members 27. If the signature was successful, the DAG agents 25 multicast the certified response 30 to the server agent collective 29. Server agent collective 29 validates the signature, and if valid, responds by signing the command test with their own multiparty digital signature and multicasting it to the DAG. If the server collective 29 cannot validate the signature, it responds with a negative acknowledgement.

Figure 3:
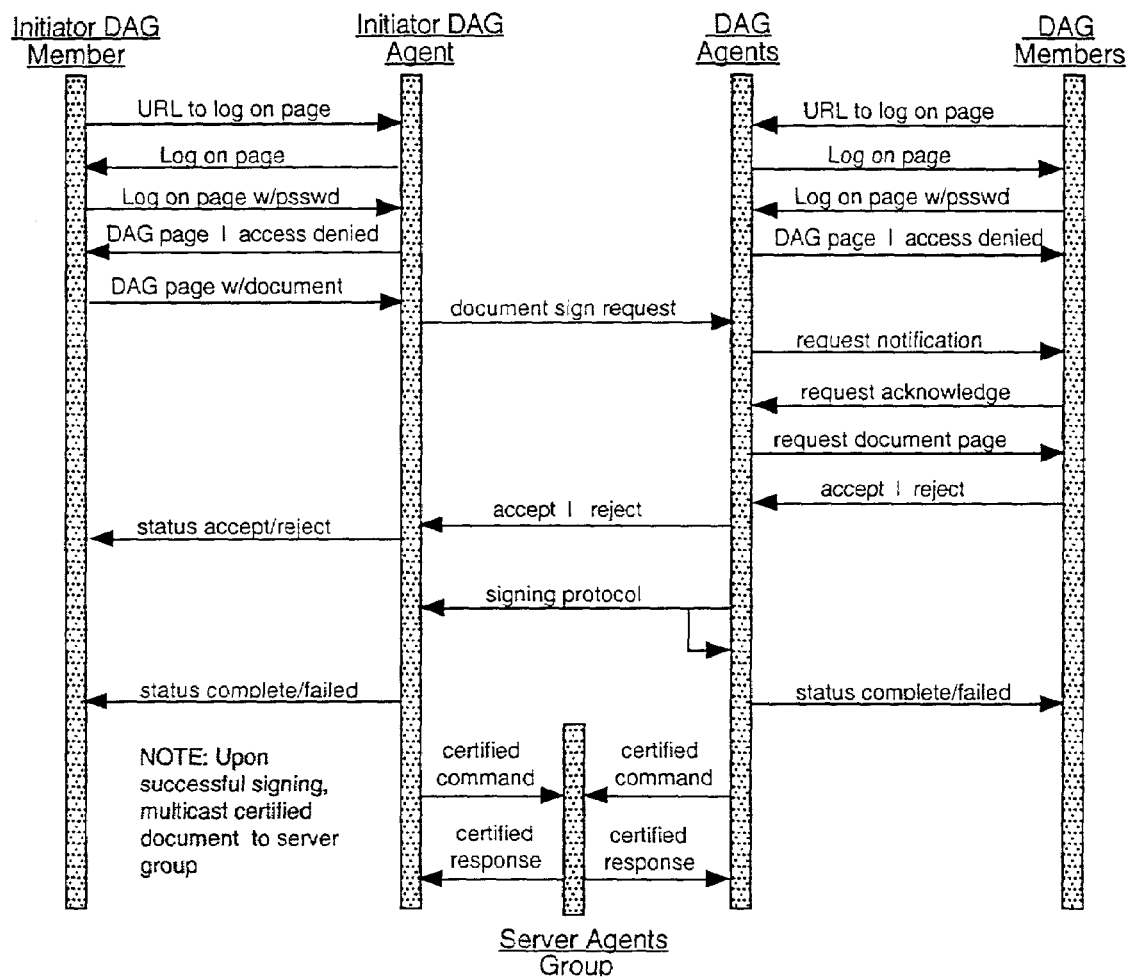
FIG. 3 is a diagram showing a detailed example use of a domain authority group workflow process according to the present invention.

FIG. 3 is a diagram showing a detailed example use of a domain authority group workflow process according to the present invention. FIG. 3 further show the details discussed above illustrating a use of the DAG protocol, in a detailed DAG workflow process diagram, depicting interactions using URLs to World Wide Web pages and showing a server agents group.

The present invention with multiple agents includes a transaction framework for secure agents (for example, a decentralized domain authority (DDA)) and a secure distributed agent collection (SDAC). Two examples of DDA are: 1) the use of intelligent agents with human administration, and 2) the use of one virtual administrator out of a group of administrators. A computer coalition controlled by a domain authority group (DAG) can have special features. First, each processing computer implements an authenticating chokepoint filter to reject network commands and data that are not signed with a valid digital group certification signature. It also can report all invalid command and data attempts to the other group members to alert the group of a possible intruder. A "certified command" is a message from the DAG that has a valid group signature.

In addition, processing computers need to defend against well-known network attacks as well as operating system and hardware tampering. To prevent a comprimised computer from circumventing DAG security, the computer coalition also must implement a group signature protocol to certify its responses to the DAG and under some circumstances to users as well. Consequently, the computer coalition has a separate group signature process with a distinct public-private key pair. A "certified result" is a published response from the server coalition with a valid signature.

Intelligent agents can perform decentralized security monitoring and enforce security policy using distributed trust. With distributed trust, no single agent is allowed to execute or authorize a potentially dangerous act. As an example, DDA is a security policy that requires separation of duty and uses a coalition of serving computers.

In the example embodiment, decentralized domain authority (DDA) is used to prevent an attack by a single malicious administrator or a minority coalition of malicious administrators. Under DDA, administrative functions performed on the computers in the domain that have system-high consequences require a majority consensus of administrators before action is taken on any network server. DDA security policy enforces an N-person rule through distributed intelligent agents and secure protocols, can require administrators to carry a secure credential to participate in a DAG (for example, a portable security agent, an "agent on a stick," a microdisk card), and can require secure consensus protocols for security-critical operations.

The administrators form a Domain Authority Group (DAG) in which authority to perform critical operations is decentralized. The DAG can be a group of administrators that share authority for a network of serving computers. Critical changes to computer configurations and software are sent via network commands that are authenticated using a threshold digital signature. No single administrator has ultra-privileges. Instead, the DAG comprises a virtual administrator (VA), an entity that is conceptually an extension of the well-known separation of duty security policy (for example, the N-person rule). The DAG engages in an N-person group signature procedure that signs a request before any computer can accept the request. In an N/M majority consensus (N-person rule), N loyal agents out of a total of M agents must approve access for access to be granted. Computers are initialized with special software that enable the performance of certain network services only upon validation of the requests using a pre-specified public key. The DAG works within a collaborative process with redundancy of activities. For example, to add a new user to the network, a specific majority of administrators review the potential new user's credentials then engage in the group signature process to sign those credentials. The signed credential is multicast by each DAG member to all the network processing computers. Upon reaching consensus and validating the group signature, the computers add the new user to their respective access control lists. All the computers notify the DAG that the access list has been updated, and the transaction is complete. The process enables DAG members to create certified commands to the serving computer group.

Example Method

Figure 4:
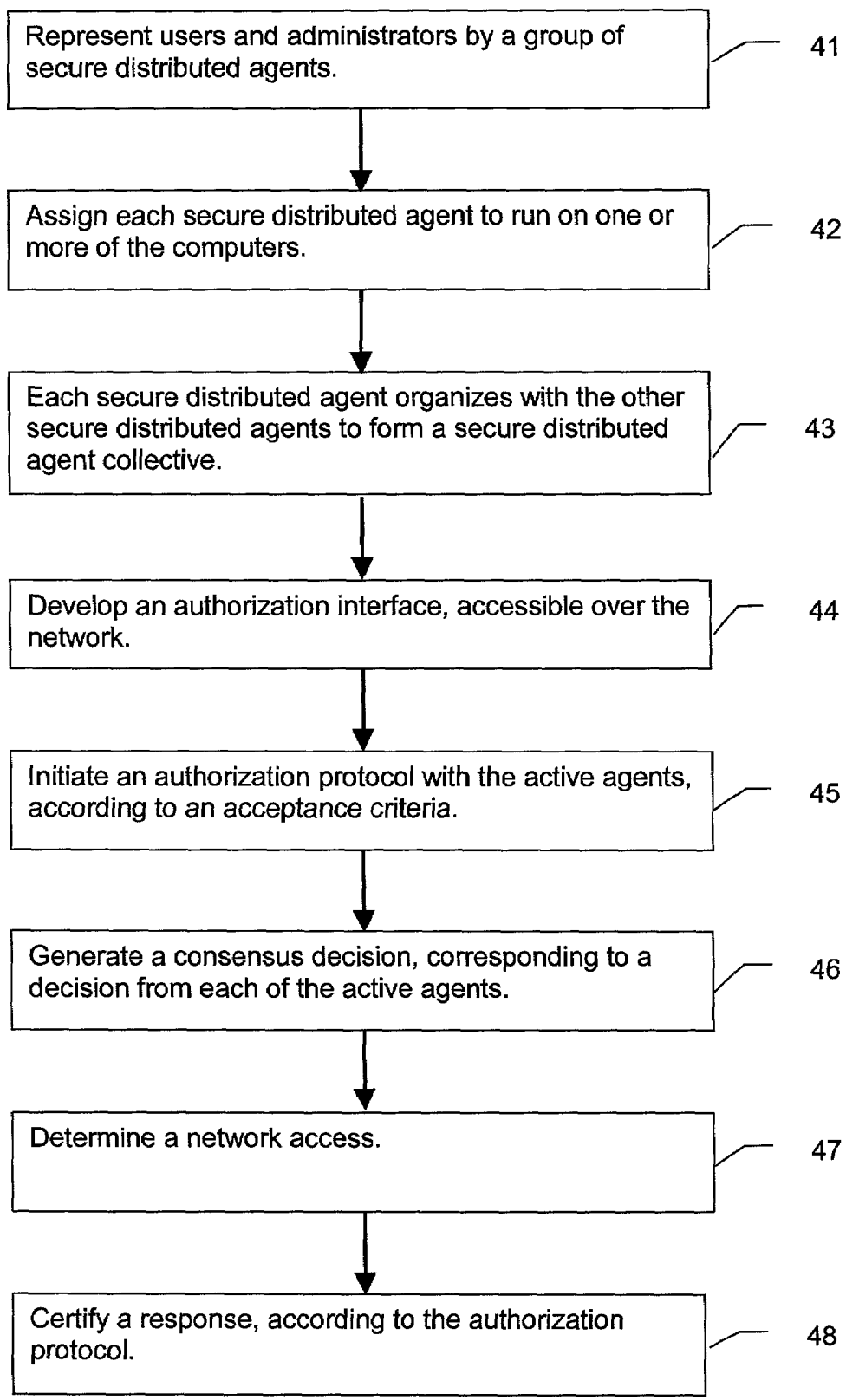
FIG. 4 is a flow diagram of an example authorization process according to the present invention.

FIG. 4 is a flow diagram of an example authorization process according to the present invention.

Represent multiple users and administrators by a group of secure distributed agents, step 41. The secure distributed agents process on one or more computers in a network environment. The computers can be in either, but are not limited to, a peer-to-peer or a client-server relationship.

Assign each secure distributed agent to run on one or more of the computers, step 42.

Each secure distributed agent organizes with the other secure distributed agents to form an agent collective, step 43. The agent collective performs in a transaction framework to control access over the network and can perform group decisions and can control one or more group transactions within the secure system.

Develop an authorization interface, accessible over the network, step 44. FIG. 3 is an example illustrating a typical use of a DAG protocol on the World Wide Web.

Initiate an authorization protocol with the active agents, according to an acceptance criterion, step 45. Not all of the secure distributed agents have to be active agents. Note that if an agent is not active, its participation in the process is not required, nor is the authorization protocol delayed.

Generate a consensus decision, corresponding to a decision from each of the active agents, step 46. For example, an N-person group signature procedure can be implemented with the active agents. Note that the N-person procedure, as used in this invention, does not require human actors but can be implemented with non-human actors, such as agents.

Determine a network access, step 47. For example, a new user can be added to the network with a specific majority of administrators reviewing the new user's credentials and engaging in the group signature process to sign those credentials, with the new user then added to access control lists to complete the transaction.

Certify a response, according to the authorization protocol, step 48. As discussed previously, DAG members can access their local personal DAG agent to gain access over the network. Commands and data without valid digital group certification signatures will be rejected.

In one application, using a Web browser, DAG members access their local personal DAG agent by entering the agent URL into a Web browser. The DAG agent returns a log-on page requiring the member's password. Upon successful log-in, the agent returns a page with the DAG name, the identifiers of the members currently logged in, and a list of URLs identifying pending signature requests issued by the DAG. A text area is presented on the page to enable entry of a signing request. A DAG member initiates a request by entering the command text into a text area on the Web page and submitting the page. The DAG agent contacts the other DAG agents with the request. The other DAG agents log the request and send the request to the DAG members for acceptance or rejection. The request page displays the text in a no-edit mode and provides a selector for acceptance. DAG members submit the page when review is complete. If all members accept the request, the DAG agents engage in a multiparty signature protocol. The results of the protocol (success or failure) are logged by the DAG agents and reported to the DAG members. If the signature is successful, the DAG agents multicast the certified command to the serving computer group (for example, part of a client-server or a peer-to-peer configuration). The serving computer group validates the signature, and if valid, responds by signing the command text with their own multiparty digital signature and multicasting it to the DAG. If the serving computer group cannot validate the signature, the server group responds with a negative acknowledgement.

The present invention can use, but is not limited to, several approaches: the use of secure intelligent agents to mediate activities, the use of threshold cryptography (threshold signature scheme), and the use of the World Wide Web (WWW) for communications. The protocol is secure under a threshold signature scheme. The present invention can be applied to any secure group decision process over a computer network (for example, using client-server or peer-to-peer connections).

An experimental embodiment has been demonstrated using an autonomous high-integrity intranet. In the demonstration, users obtain Web documents protected by multiparty digital signatures created by a virtual administrator and by a secure distributed agent collective (SDAC). SDAC accepts valid commands, rejects invalid commands, and logs all submissions. SDAC enforces network security policy. SDAC oordinates multi-agent response to security policy violations.

The experimental embodiment was tested by an "attack team" to assess vulnerabilities. On the user side, the team assessed: denial of access to documents by a single user, denial of access to documents ay all users, and spoof (i.e., deception) of a user into accepting an invalid document. On the system side, the team assessed: integrity of documents entered by a DAG, integrity of documents processed by a serving computer group, deception of a serving computer group into accepting an invalid document from the DAG, and deception in the DAG signing process by co-opting DAG members or DAG agents.

To deny information access and to assure information integrity, DDA can include, but is not limited to: N/M majority consensus, proactive threshold cryptography, secure agents, and security polity enforced by a distributed collective of intelligent software agents. N/M majority consensus requires no more than N out of M coalition members for authentication, where N must be greater than $\frac{1}{3}$ of M coalition members to authenticate. Therefore, up to ⅓ of the coalition can be corrupt without causing harm.

Proactive threshold cryptography can ensure integrity for agent coalitions of less than T corrupt or disloyal member agents. Any coalition of less than T DAG members cannot certify a domain command (non-forgeability). Any coalition of less than T members cannot prevent the remaining M-T agents (where M is the total number of agents) from certifying a domain command (robustness) or from receiving a certified response from the servers.

In one implementation of the present invention, with agents for network security, distributed agents used Distributed Common Lisp Object System (DCLOS), developed by Sandia National Laboratories, which allows objects to reside and to be moved anywhere on a network of computers by automating and hiding. In addition, the agent-to-human interface used CLOS-to-HTML Interface (CHI), also developed by Sandia National Laboratories, which allows a CLOS program to "speak web" by converting web pages to compound objects and vice-versa. This approach works for distributed agents.

Various implementations of the invention can include: use of a DAG portal, implemented as a physical add-on; use of a DAG "agent on a stick," implemented on a removable microdisk card; use of an authoritative, certified command to force reboot of a computer under group control (for example, through comparison of a shared code between a microdisk and a location in read-only memory on a computer on the network); implementation of an authenticating chokepoint filter in the operating system drivers for the network interface card, or implemented on the card itself, or implemented in hardware on the card, or implemented in the agent; and a peer-to-peer implementation, where agents are peers (i.e., where there is no server group or administrator group, but only a single group of autonomous agents that cross-authenticate information with other groups).

The particular sizes and equipment discussed above are cited merely to illustrate particular embodiments of the invention. It is contemplated that the use of the invention may involve components having different sizes and characteristics. It is intended that the scope of the invention be defined by the claims appended hereto.

The invention claimed is:

1. A distributed authorization system for processing a group authorization decision according to a security policy, the security policy running as software on a network comprising one or more computers, the distributed authorization system comprising:

an information element, accessible on the one or more computers;

means for defining access to the one or more computers;

a plurality of secure processing agents that process on the one or more computers, reviewing the information element;

an authorization interface, accessible over the network, through which each secure processing agent communicates a decision to the plurality of secure processing agents;

means for accepting the decision from each secure processing agents and forming a consensus decision on the information element;

a digital group certification signature;

means for posting a result of the consensus decision; and means for processing the consensus decision on the one or more computers, according to a security policy.

2. The distributed authorization system of claim 1, further comprising:

means for validating the digital group certification signature;

an authenticating chokepoint filter, implemented on the one or more computers, for rejecting an invalid digital group certification signature; and means for certifying a processing of the consensus decision.

3. The distributed authorization system of claim 2, wherein the means for certifying the processing of the consensus decision comprises a group signature protocol having a public-private key pair.

4. The distributed authorization system of claim 1, wherein the digital group certification signature has a threshold signature scheme.

5. The distributed authorization system of claim 1, wherein the one or more computers is a network of computers having communications between each computer in the network.

6. A method for using an authorization system to control a group transaction on a network, wherein the network comprises one or more computers, wherein the authorization system comprises a plurality of secure agents, the method comprising:

loading a secure agent onto at least one computer in the network; organizing the secure agent with at least one other secure agent, forming an agent collective;

controlling the group transaction on the network, according to a plurality of policies and protocols, thereby providing a group transaction control;

developing an authorization interface, accessible over the network, wherein each secure agent communicates a decision to the plurality of secure agents;

accepting a decision from each secure agent, according to a group authentication protocol for a transaction; and generating a group consensus decision.

7. The method of claim 6, wherein the group authentication protocol comprises a digital group certification signature.

8. The method of claim 7, further comprising:

validating the digital group certification signature; and implementing an authenticating chokepoint filter, for rejecting an invalid digital group certification signature.

* * * * *